United States Patent
Frei et al.

(10) Patent No.: US 12,551,880 B2
(45) Date of Patent: Feb. 17, 2026

(54) METHOD AND DEVICE FOR DETECTING CONTACT OF A PIPETTE TIP WITH A LIQUID AS WELL AS A LABORATORY SYSTEM WITH SUCH A DEVICE

(71) Applicant: TECAN TRADING AG, Männedorf (CH)

(72) Inventors: Luca Frei, Rapperswil (CH); Pascal Dieterich, Wetzikon (CH); Sabrina Harsch, Zürich (CH); Nemanja Popovic, Zürich (CH); Benjamin Dörner, Munich (DE)

(73) Assignee: TECAN TRADING AG, Männedorf (CH)

( * ) Notice: Subject to any disclaimer, the term of this patent is extended or adjusted under 35 U.S.C. 154(b) by 645 days.

(21) Appl. No.: 18/076,600

(22) Filed: Dec. 7, 2022

(65) Prior Publication Data
US 2023/0191390 A1 Jun. 22, 2023

(30) Foreign Application Priority Data
Dec. 22, 2021 (EP) .................................... 21217180

(51) Int. Cl.
*B01L 3/02* (2006.01)
(52) U.S. Cl.
CPC ....... *B01L 3/021* (2013.01); *B01L 2300/0627* (2013.01)
(58) Field of Classification Search
None
See application file for complete search history.

(56) References Cited

U.S. PATENT DOCUMENTS

| | | | | |
|---|---|---|---|---|
| 6,081,820 A | * | 6/2000 | Holowko | H03H 17/0261 708/671 |
| 6,107,810 A | * | 8/2000 | Ishizawa | G01N 35/1009 422/511 |
| 2002/0009393 A1 | * | 1/2002 | Ishizawa | G01N 35/1009 422/562 |
| 2006/0096396 A1 | * | 5/2006 | Harazin | G01N 35/1011 73/866.5 |

(Continued)

OTHER PUBLICATIONS

Mar. 12, 2025 European Examination Report for corresponding European Patent Appl. No. EP 21 217 180.5.

*Primary Examiner* — Lina Cordero
(74) *Attorney, Agent, or Firm* — Notaro, Michalos & Zaccaria P.C.

(57) ABSTRACT

A method for detecting contact of a pipette tip with a surface of a liquid in a pipetting device is disclosed. The method consists of moving the pipette tip in the direction of the surface of the liquid thereby measuring an absolute capacitance between the pipette tip and a reference potential and generating a sampled output signal. A predicted momentary sample value of the output signal is generated based on a plurality of past sample values of the output signal. A contact signal indicative of the pipette tip being in contact with the surface of the liquid is generated based on comparing a momentary sample value of the output signal with the predicted momentary sample value of the output signal. A corresponding pipetting device capable of performing the method as a laboratory system, in particular an automated liquid processing system, with one or more such pipetting devices are proposed.

23 Claims, 5 Drawing Sheets

(56) References Cited

U.S. PATENT DOCUMENTS

| | | | |
|---|---|---|---|
| 2008/0053216 A1* | 3/2008 | Li | G01F 23/268 |
| | | | 73/290 R |
| 2009/0071245 A1* | 3/2009 | Harazin | G01F 23/268 |
| | | | 73/290 R |
| 2012/0024055 A1* | 2/2012 | Knight | G01F 23/263 |
| | | | 73/304 C |
| 2017/0003242 A1* | 1/2017 | Wiedekind-Klein | |
| | | | G01N 33/48785 |
| 2017/0220026 A1* | 8/2017 | Tighe | G01N 35/1011 |
| 2019/0376994 A1* | 12/2019 | Pawlowski | G01N 35/1016 |

* cited by examiner

METHOD AND DEVICE FOR DETECTING CONTACT OF A PIPETTE TIP WITH A LIQUID AS WELL AS A LABORATORY SYSTEM WITH SUCH A DEVICE

TECHNICAL FIELD

The present invention is related to the technical field of sample liquid processing in automated laboratory systems, more particularly to liquid level detection. Specifically, the present invention pertains to a method for detecting contact of a pipette tip with a surface of a liquid in a pipetting device as well as a pipetting device capable of performing such a method. One or more such pipetting devices can be part of a laboratory system, in particular an automated liquid processing system, as used in medical, pharmaceutical, and chemical laboratories, where large amounts of sample liquids need to be processed quickly and reliably.

BACKGROUND OF THE INVENTION

Laboratories conducting large-scale sample analysis in the medical, pharmaceutical, or chemical industries require systems for quickly and reliably processing small volumes of liquid (commonly on the order of microliters) provided in containers such as sample tubes or microplates.

Pipetting of sample liquids is at the core of these processes. Therefore, automated laboratory systems usually comprise one or more pipetting devices for (parallel) processing of sample liquids in containers situated on a worktable. Such a system can operate completely hands-free under computer control. Accordingly, these systems can run for hours or days at a time with no human intervention.

In order to guarantee high-quality analytical results such an automated system must be able to process predetermined volumes of liquid very precisely and consistently over time. Typically, one or more pipette tubes with a pipette tip are mounted on a motorised transport device (with a corresponding number of vertically extendable/retractable pipette tube holders), which allows to move the pipette tip, to an exact position at a container, to immerse the pipette tip into the liquid and then aspirate a desired amount of the liquid into the pipette tip. This is especially challenging when the filling level varies from one container to another. In order to avoid sucking in air it must be ensured that the pipette tip is sufficiently immersed into the liquid (but not too much to limit contamination of the pipette tip with the liquid), which in turn requires a reliable and fast detection of when the pipette tip contacts/touches the surface of the liquid, since moving of the pipette tip into the liquid must then be promptly stopped in order not to exceed a predetermined maximum immersion depth.

Liquid contact detection is often performed by means of monitoring the capacitance between the pipette tip and a reference potential (usually a grounded worktable or base plate upon which the container with the liquid is arranged, e.g., whereby the container is held in a carrier). When the pipette tip touches the liquid a sudden increase ("jump", e.g., by less than a picofarad) of the measured capacitance can be observed, because of a dominant effect of the sample liquid's capacitance. Thereby, the necessary sensitivity is typically achieved by measuring relative capacitance due to the limited dynamic range and resolution of the capacitance measurement circuitry. The measured capacitance depends on (i.e., is influenced by) several different factors such as for instance the material and geometry of the employed labware (e.g., the containers and carriers holding the containers), the volume of the sample liquid, the type of liquid (in particular its conductivity and permittivity), the amount and type of liquid present in neighbouring containers, as well as the measurement activities in neighbouring containers. The trend towards more parallelism and high integration leads to a high spatial compactness of the individual components. Due to the dense construction, the mutual influence (e.g., capacitive coupling) of adjacent measuring channels can lead to problems. Consequently, known systems require elaborate calibration and careful adjustment of a multitude of parameters for the particular labware and sample liquids involved in order to guarantee the required measurement precision and reliability, especially in terms of liquid contact detection.

Therefore, there exists a need for reliable means to perform liquid contact detection in laboratory systems, which are less susceptible to the effects caused by different sample liquids and the use of different labware, especially in liquid processing systems comprising a plurality of densely spaced concurrent measurement channels.

SUMMARY OF THE INVENTION

It is an object of the present invention to provide a method for detecting contact of a pipette tip with a surface of a liquid in a pipetting device. This object is reached by the method specified in claim 1.

It is a further goal of the present invention to provide a pipetting device capable of performing the proposed method for detecting contact of a pipette tip with a surface of a liquid as well as a laboratory device, such as an automated liquid processing/handling system comprising one or more of the proposed pipetting devices, respectively. This aim is achieved by the device and system according to claims 12 and 23, respectively.

Specific embodiments of the method and device according to the present invention are given in the dependent claims.

According to a first aspect of the present invention a method for detecting contact of a pipette tip with a surface of a liquid in a pipetting device comprising the following steps is proposed:

moving the pipette tip in direction of the surface of the liquid;

measuring an absolute capacitance between the pipette tip and a reference potential, such as a grounded base plate upon which a container with the liquid is arranged (e.g., in a carrier), and generating a sampled output signal;

predicting a momentary/current/present sample value of the output signal based on a plurality of past sample values of the output signal and generating a predicted momentary/current/present sample value of the output signal;

generating a contact signal based on comparing a momentary sample value of the output signal with the predicted momentary sample value of the output signal, in particular by comparing a difference between a momentary sample value of the output signal and the predicted momentary sample value of the output signal with a predetermined threshold, in particular a user/manually selectable and/or adjustable threshold, the contact signal being indicative of the pipette tip being in contact with (or touching) the surface of the liquid (or being submerged in the liquid).

Contrary to previously employed methods based on measuring a relative capacitance between the pipette tip and a reference potential, the presently proposed method is based on measuring an absolute capacitance. This has the advantage that not only momentary changes in the capacitance can be detected but also the actual value of the capacitance can be determined at any time and can be compared with a past value not immediately preceding a present value. In this way it is for example possible to discriminate between short disturbances, for instance due to electrostatic discharges (ESD), which lead to brief surges of the measured absolute capacitance, and the sudden increase in capacitance caused by the pipette tip touching the surface of the liquid. In the case of an absolute capacitance measurement the capacitance will remain at a higher level when the pipette tip stays in the liquid. However, in the case of a relative capacitance measurement there is no further change in the capacitance when the pipette tip stays in the liquid, and therefore the measured relative capacitance becomes zero-like when an ESD spike has occurred.

The method of the present invention relies on comparing a momentary (i.e., the current/present) sample value of the output signal with a predicted momentary sample value of the output signal, wherein the predicted value is based on a plurality of past sample values of the output signal. Thereby it is assumed that the output signal will remain essentially the same when no increase in capacitance occurs when the pipette tip does not contact the surface of the liquid, and therefore the difference between the predicted momentary sample value and the current momentary sample value will only be small, i.e., below a predetermined threshold. When the pipette tip touches the surface of the liquid the capacitance will abruptly increase so that there will be a large difference between the predicted momentary sample value and the current momentary sample value, i.e., the difference will exceed a predetermined threshold. Comparing this difference with the predetermined threshold provides a very reliable indication of when the pipette tip contacts the surface of the liquid that is far less sensitive to the effects stated above associated with the use of different sample liquids and different labware, especially in liquid processing systems comprising a plurality of densely spaced concurrent measurement channels, where capacitive coupling occurs.

The proposed method allows to detect when contact of the pipette tip with the surface of the liquid takes place essentially without any delay, because there is no need to verify the contact detection by further observing whether the measured absolute capacitance remains at a higher level following the increase/jump, which would delay the contact decision. The maximum allowable immersion depth of the pipette tip is very limited (typically less than 2 mm) and puts constraints on the contact detection delay, the immersion speed and the braking response of the drive moving the pipette tip downward into the liquid.

Therefore, a long contact detection delay is undesirable because it limits the speed with which the pipette tip may be immersed into the liquid and thus generally reduces the throughput of the pipetting device and the liquid processing system of which it is part of.

In an embodiment of the method generating the output signal comprises the step of:
applying samples of the measured absolute capacitance to a median filter, in particular a median filter of order in the range from three to six, more particularly a third order median filter.

In this way outliers caused by erratic interference (such as ESD spikes) are removed from the output signal.

In a further embodiment of the method measuring the absolute capacitance is performed at a first sampling rate and the sampled output signal is generated at a second sampling rate by means of down sampling, in particular by a factor of N in the range from 2 to 64, more particularly in the range from 2 to 8, wherein down sampling is in particular performed by determining a sum of or an average over N consecutive samples to generate a sample of a down sampled output signal.

In this way noise is reduced and the signal-to-noise ratio (SNR) of the output signal is increased. It is to be noted that if both down sampling and median filtering are applied the former would take place before the latter.

In a further embodiment of the method predicting comprises applying one or more of the following to the output signal:
curve fitting;
finite impulse response (FIR) filtering;
infinite impulse response (IIR) filtering;
unweighted or weighted, e.g., exponentially weighted, (windowed, recursive) moving average filtering;
linear or polynomial prediction;
linear or polynomial regression;
Kalman filtering.

The proposed techniques can either be employed individually (whereby two or more instances of the same technique, e.g., two FIR filters, where each instance uses different parameters, may be used in combination) or in combination (i.e., two or more different techniques).

In a further embodiment of the method predicting comprises applying the output signal to a sliding window averaging filter, wherein the window length is in particular in the range from 8 to 64, more particularly in the range from 16 to 32.

In this way the predicted momentary sample value is simply a (non-weighted or weighted) average over (a limited number of) previous values of the measured signal (after down sampling and/or median filtering), whereby these previous values may all be weighted equally or they may be weighted differently, for instance to emphasize newer values over older values. This can be implemented in the form of a finite impulse response (FIR) filter, or alternatively, an infinite impulse response (IIR) filter can be employed, such as a very simple first order IIR filter providing an exponentially weighted moving average.

In a further embodiment of the method the step of predicting comprises applying the output signal to a first sliding window averaging filter and a second sliding window averaging filter, wherein the window length of the first and second filter is in particular identical and in particular in the range from 8 to 64, more particularly in the range from 16 to 32. For instance, the output signal is applied to a first sliding window averaging filter and a delayed version of the output signal is applied to a second sliding window averaging filter. This can for instance be implemented by a delay line capable of storing L=L1+L2 previous sample values of the output signal and a first FIR filter of length L1 (i.e., the first sliding window averaging filter) employing the first L1 sample values and a second FIR filter of length L2 (i.e., the second sliding window averaging filter) employing the last L2 sample values from the delay line. The predicted momentary sample value of the output signal is then based on the two outputs from the first and second filter. It should be noted that the window length of both filters can be the same (e.g., L1=L2) or they may also be different (e.g., L1<L2, wherein the first filter of length L1 averages more recent samples than the second filter of length L2).

In a further embodiment of the method a slope of the output signal is determined based on an output of the first sliding window averaging filter and an output of the second sliding window averaging filter, in particular wherein the predicted momentary sample value is based on linearly extrapolating the output of the first sliding window averaging filter and the output of the second sliding window averaging filter. In this way the difference between the outputs of the first filter and second filter, whereby the first filter for instance processes more recent sample values of the output signal than the second filter, provides an indication of whether the output signal is tendentially increasing, decreasing, or steady. Once this trend has been determined the expected momentary sample value of the output signal can for instance be predicted by means of linear extrapolation. This concept may be extended to the extrapolation of polynomial functions based on results of applying the output signal to a plurality of sliding window averaging filters, e.g., to determine polynomial coefficients.

In a further embodiment the method further comprises the step of:
predicting a further momentary sample value of the output signal based on a plurality of past sample values of the output signal and generating a further predicted sample value of the output signal,
wherein predicting the further momentary sample value is performed differently than predicting the momentary sample value, in particularly based on one or more features mentioned above for predicting different than that or those used for predicting the momentary sample value, and
wherein the step of generating the contact signal is further based on comparing the momentary sample value of the output signal with the further predicted momentary sample value of the output signal, in particular by comparing a difference between the momentary sample value of the output signal with the further predicted momentary sample value of the output signal with a further predetermined threshold, in particular a user/manually selectable and/or adjustable threshold, the further predetermined threshold in particular being the same as the predetermined threshold in this way the reliability of the contact signal correctly indicating that the pipette tip has touched the surface of the liquid is increased.

In a further embodiment of the method the past sample values of the output signal are at least older by two sampling periods of the output signal than the momentary sample value, more particular older by three sampling periods. As previously explained, the proposed method is based on monitoring the difference between the momentary sample value and the predicted momentary sample value of the output signal. As the pipette tip gets close to the surface of the liquid the measured capacitance will gradually start to increase (due to the increased capacitive coupling of the pipette tip with the liquid). Consequently, the predicted momentary sample value will also increase. In order to improve the reliability of contact detection (by using a higher comparison threshold) the output signal samples in the transition area from the steady state to the jump of the output signal, i.e., where the output signal gradually begins to rise, are best disregarded for the purposes of predicting the momentary sample value. Therefore, the past sample values of the output signal employed for prediction should be at least older by two sampling periods of the output signal than the momentary sample value with which the predicted momentary sample value is compared.

In a further embodiment of the method measuring the absolute capacitance comprises charging and discharging a capacitor formed between the pipette tip and the reference potential and determining a charging time, in particular an elapsed time for charging the capacitor from a first charging state to a second charging state, the charging time in particular being determined by a time-to-digital converter, wherein a measuring frequency is equal to a charging/discharging rate, and in particular in the range from 100 kHz to 500 kHz, more particularly in the range from 200 kHz to 400 kHz.

In a further embodiment of the method charging the capacitor is performed by a voltage source or a current source via a charging resistor, and discharging is in particular performed via a switch, such as a transistor, in particular a field effect transistor (FET), in particular via a discharging resistor. The charging resistor may also be the discharging resistor. However, the charging resistor can be different than (i.e., at least partly separate from) the discharging resistor in order to be able to individually/separately set the durations of the charging and discharging cycles.

According to a further aspect of the present invention a pipetting device capable of detecting contact of a pipette tip with a surface of a liquid is proposed. The pipetting device comprises:
a pipette with the pipette tip adapted to aspirate and/or dispense the liquid;
a transport unit, to which the pipette is attached, adapted and configured to move the pipette tip in direction of the surface of the liquid;
a capacitance measuring unit adapted and configured to measure art absolute capacitance between the pipette tip and a reference potential, such as a grounded base plate upon which a container with the liquid is arranged (e.g., in a carrier), and to generate a sampled output signal;
a prediction unit adapted and configured to predict a momentary sample value of the output signal based on a plurality of past sample values of the output signal and to generate a predicted momentary sample value of the output signal;
a detection unit adapted and configured to generate a contact signal based on comparing a momentary sample value of the output signal with the predicted momentary sample value of the output signal, in particular by comparing a difference between a momentary sample value of the output signal and the predicted momentary sample value of the output signal with a predetermined threshold, in particular a user/manually selectable and/or adjustable threshold, the contact signal being indicative of the pipette tip being in contact with the surface of the liquid (or being submerged in the liquid).

In an embodiment the device further comprises, in particular as part of the capacitance measuring unit, a median filter adapted and configured to perform median filtering on samples of the measured absolute capacitance and to generate the samples of the output signal, in particular a median filter of order in the range from three to six, more particularly a third order median filter.

In a further embodiment the device further comprises, in particular as part of the capacitance measuring unit, a down sampling unit adapted and configured to perform down sampling from a first sampling rate at which measuring the absolute capacitance is performed to a second sampling rate at which the sampled output signal is generated, in particular by a factor of N in the range from 2 to 64, more particularly in the range from 2 to 8, wherein down sampling is in particular performed by determining a sum of or an average over N consecutive samples to generate a sample of a down sampled output signal.

In a further embodiment of the device the prediction unit comprises one or more of the following to which the output signal is applied:
- a curve fitting unit;
- a finite impulse response (FIR) filter;
- an infinite impulse response (IIR) filter;
- an unweighted or weighted, e.g., exponentially weighted, (windowed, recursive) moving average filter;
- a linear or polynomial prediction unit;
- a linear or polynomial regression unit;
- a Kalman filter.

In a further embodiment of the device the prediction unit comprises a sliding window averaging filter to which the output signal is applied, wherein the window length is in particular in the range from 8 to 64, more particularly in the range from 16 to 32.

In a further embodiment of the device the prediction unit comprises a first sliding window averaging filter and a second sliding window averaging filter in series to which the output signal is applied, wherein the window length of the first filter and second filter is in particular identical and in particular in the range from 8 to 64, more particularly in the range from 16 to 32.

In a further embodiment of the device the prediction unit is adapted and configured to determine a slope of the output signal based on an output of the first sliding window averaging filter and an output of the second sliding window averaging filter, in particular wherein the predicted momentary sample value is based on linearly extrapolating the output of the first sliding window averaging filter and the output of the second sliding window averaging filter.

In a further embodiment of the device the prediction unit is adapted and configured to predict a further momentary sample value of the output signal based on a plurality of past sample values of the output signal and generating a further predicted momentary sample value of the output signal, wherein predicting the further momentary sample value is performed differently than predicting the momentary sample value, in particularly based on one or more of the features mentioned above to predict a momentary sample value different than that or those used for predicting the momentary sample value, and wherein the prediction unit is adapted and configured to generate the contact signal further based on comparing the momentary sample value of the output signal with the further predicted momentary sample value of the output signal, in particular by comparing a difference between the momentary sample value of the output signal with the further predicted momentary sample value of the output signal with a further predetermined threshold, in particular a user/manually selectable and/or adjustable threshold, the further predetermined threshold in particular being the same as the predetermined threshold.

In a further embodiment of the device the past sample values of the output signal are at least older by two sampling periods of the output signal than the momentary sample value, more particular older by three sampling periods.

In a further embodiment of the device the capacitance measuring unit comprises a charging unit and a discharging unit adapted and configured to charge and discharge a capacitor formed between the pipette tip and the reference potential and a time measurement unit adapted and configured to determine a charging time, in particular an elapsed time for charging the capacitor from a first charging state to a second charging state, the time measurement unit in particular being a time-to-digital converter, wherein a measuring frequency is equal to a charging/discharging rate, and in particular in the range from 100 kHz to 500 kHz, more particularly in the range from 200 kHz to 400 kHz.

In a further embodiment of the device the charging unit comprises a voltage or current source and a charging resistor, and the discharging unit in particular comprises a switch, such as a transistor, in particular a field effect transistor (FET), and in particular a discharging resistor.

According to a further aspect of the present invention a laboratory system, in particular an automated liquid processing system, comprises one or more of the pipetting devices according to the present invention as proposed above.

It is specifically pointed out that combinations of the embodiments described above can result in even further, more specific embodiments.

BRIEF DESCRIPTION OF THE DRAWINGS

The present invention is further explained below by means of non-limiting specific embodiments and with reference to the accompanying drawings, which show the following.

In the figures, like reference signs refer to like parts.

DETAILED DESCRIPTION OF THE INVENTION

Figure 1:
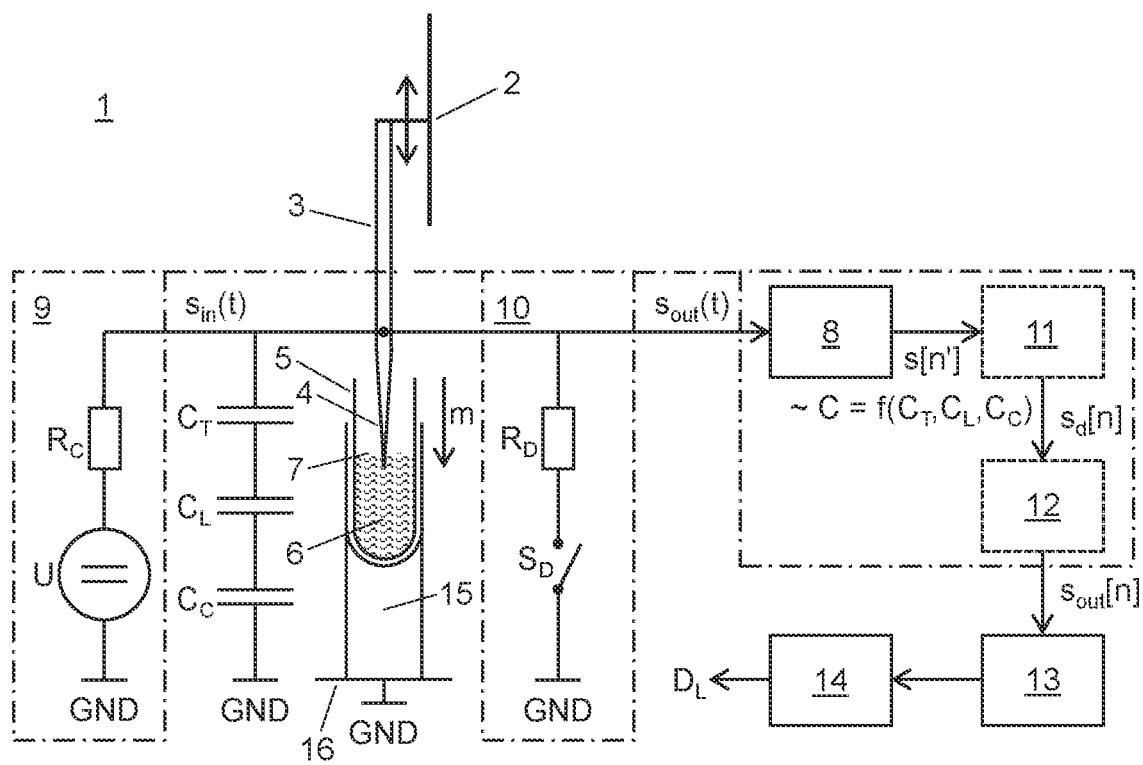
FIG. 1 a schematic illustration of a pipetting device according to the present invention.

FIG. 1 shows a schematic illustration of a pipetting device 1 according to the present invention. The pipetting device 1 comprises a pipette 3 (a pipette tube) onto which a pipette tip 4 adapted to aspirate and/or dispense a liquid 6 present in a container 5 is mounted. The pipette tip 4 may be a disposable tip intended for single use (and replaced thereafter with a new one) or may be formed integrally with the pipette tube 3. The pipette 3 is attached to a transport unit 2 which can move the pipette tip 4 towards and into the liquid 6 (indicated by the arrow marked with an m to the right of the pipette tip 4), and subsequently remove the pipette tip 4 out of and away from the liquid 6 after aspirating a sample of the liquid 6 (the up and down movements being indicated by the double arrow next to the transport unit 2). The pipetting device 1 according to the present invention is capable of detecting contact of the pipette tip 4 with the surface 7 of the liquid 6. To achieve this, the pipetting device 1 comprises a capacitance measuring unit 8 adapted and configured to measure an absolute capacitance C between the pipette tip 4 and a reference potential, such as ground (GND), e.g., a grounded base plate 16 upon which a container 5 with the liquid 6 is arranged, e.g., held by a carrier 15. The absolute capacitance C depends on (i.e., is a function f of) a tip capacitance $C_T$, a liquid capacitance $C_L$ and a carrier (or labware) capacitance $C_C$ (including the capacitance of the container) which is indicated by the series connection of the three capacitors $C_T$, $C_L$ and $C_C$ in FIG. 1. It is to be noted that additional stray/parasitic capacitances may further contribute to the absolute capacitance C.

The absolute capacitance C is measured periodically at a certain sampling rate. This can be done in a variety of different ways. The measuring capacitor can for instance be excited by a sinusoidal voltage signal whereby the magnitude and phase of the response will be dependent on the capacitance. Alternatively, the measuring capacitor can be part of an oscillator circuit which consists of a coil and the measuring capacitor and in which the resonant frequency of the oscillator circuit is dependent on the measuring capacitor. According to FIG. 1 the capacitance measuring unit 8 comprises a charging unit 9 and a discharging unit 10 (all within dash-clotted lines) which charge and discharge the measuring capacitor formed between the pipette tip 4 and the reference potential GND. A time measurement unit (not explicitly shown in FIG. 1) determines a charging time (e.g., an elapsed time for charging the capacitor from a first charging state to a second charging state). The time measurement unit can for instance be realised by a time-to-digital converter such as the TDC7200 from Texas Instruments. The measuring frequency is then equal to a charging/discharging rate of the measuring capacitor and is for instance in the range from 100 kHz to 500 kHz, more particularly in the range from 200 kHz to 400 kHz. The charging unit 9 comprises a voltage source U and a charging resistor $R_C$. The charging time is dependent on the value of the charging resistor $R_C$ and the current value of the measuring capacitor. The absolute capacitance C can therefore be determined from the measured charging time. The discharging unit 10 comprises a switch $S_D$, which can for instance be implemented with a transistor, such as a field effect transistor (FET), and a discharging resistor $R_D$. The discharging time is dependent on the value of the discharging resistor $R_D$ and the current value of the measuring capacitor C. The absolute capacitance may therefore also be determined from the measured discharging time. The value of the discharging resistor $R_D$ may be chosen to be smaller than the value of the charging resistor $R_D$ in order to achieve very rapid discharging which in turn allows to increase the measuring frequency. The voltage source U provides a constant charging voltage during charging and 0V (or the charging unit 9 is disconnected from the pipette tip 4) during discharging.

Figure 2:
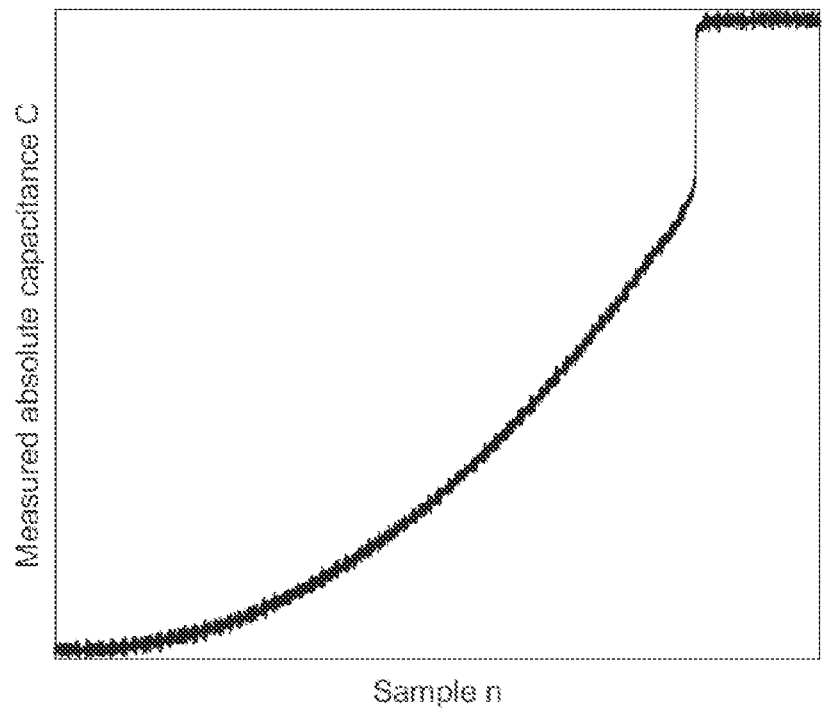
FIG. 2 an exemplary graph of the progression over time of a measured absolute capacitance as a pipette tip is lowered towards and then into a liquid.

FIG. 2 shows an exemplary graph of the progression over time of the measured absolute capacitance C as the pipette tip 4 is lowered towards the surface 7 and then into the liquid 6. As can be seen in this graph the absolute capacitance C gradually increases as the pipette tip 4 gets closer to the liquid 6 (during which the various contributing capacitances $C_T$, $C_L$ & $C_C$ are changing due to the varying geometry) and when the pipette tip 4 touches the surface 7 of the liquid 6 an abrupt jump in the value of the measured absolute capacitance C occurs. This sudden increase of the measured absolute capacitance C is due to the dominating effect of the capacitance $C_L$ of the liquid 6 when the pipette tip 4 is immersed in (i.e., in contact with) the liquid 6.

The aim of the present invention is to reliably and quickly determine when such a capacitance jump occurs to provide a contact signal indicating that the pipette tip 4 has touched the surface 7 of a liquid 6. Reliable detection of this contact event implies a low rate of false detections caused by interferences such as noise and cross coupling (e.g., due to capacitive coupling from neighbouring pipetting devices). Rapid detection of this contact event is necessary because moving of the pipette tip 4 to far into the liquid should be prevented. Thereby, the detection delay negatively impacts the (maximum) delivery speed by which the pipette tip 4 may be lowered into the container 5

According to the present invention contact detection is based on comparing a momentary (i.e., a current/present) sample value of the output signal $s_{out}[n]$ of the capacitance measuring unit 8 with a predicted momentary sample value of this output signal $s_{out}[n]$. Hereby, the predicted momentary sample value of the output signal $s_{out}[n]$ is based on a plurality of past sample values of the output signal $s_{out}[n]$. This prediction is performed by the prediction (or estimation) unit 13. The contact signal $D_L$ which indicates when the pipette tip 4 comes into contact with the surface 7 of the liquid 6 is for instance based on comparing a difference between the momentary sample value of the output signal $s_{out}[n]$ and the predicted momentary sample value of the output signal $s_{out}[n]$ with a predetermined threshold TH. The threshold TH may be a user/manually selectable and/or adjustable threshold. Generation of the liquid contact signal (indicator) $D_L$ is accomplished by the detection unit 14.

In order to decrease the false alarm rate of the liquid contact detection a number of optional measures may be taken. The purpose of these measures is to increase detection immunity against various sources of interference.

Figure 3:
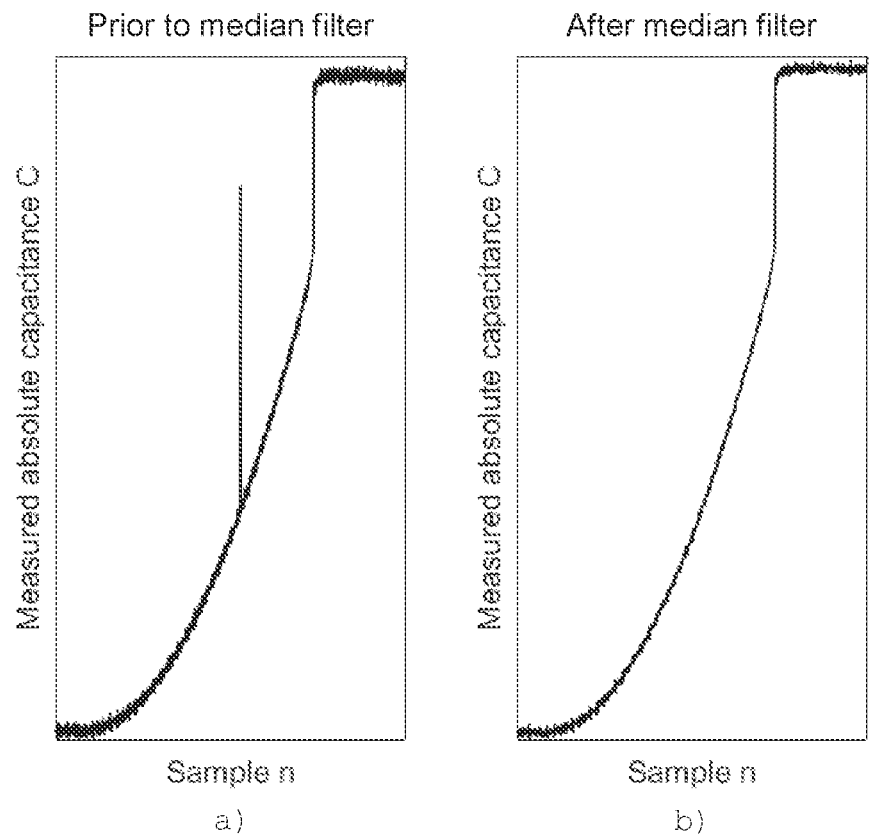
FIG. 3 an exemplary graph of the progression over time of a measured absolute capacitance as a pipette tip is lowered towards and then into a liquid a) without and b) with applying a median filter according to the present invention.

The samples of the measured absolute capacitance C may optionally be applied to a median filter 12, for example of order three. This median filter 12 selects the median value of three consecutive samples (i.e., the one with the middle value between the minimum and maximum value of the three sample) as its output. In this way outliers caused by erratic interference, such as electrostatic discharge (ESD) spikes, are removed from the output signal. This is clearly illustrated in FIG. 3 which shows an exemplary graph of the progression over time of a measured absolute capacitance as a pipette tip is lowered towards and then into a liquid a) when not applying the median filter 12 when a prominent ESD spike is present which would lead to a false liquid contact detection and b) when applying the median filter 12 which eliminates the ESD spike.

Figure 4:
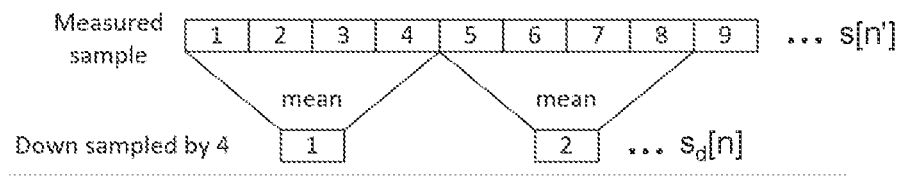
FIG. 4 a schematic illustration of down sampling according to the present invention.
Figure 8:
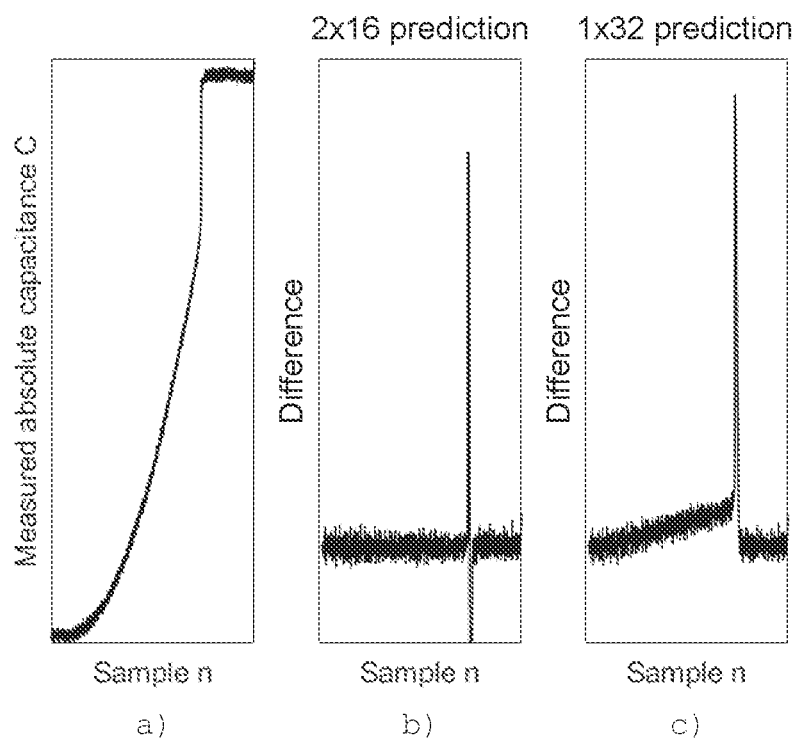
FIG. 8 *a*) an exemplary graph of the progression over time of a measured absolute capacitance as a pipette tip is lowered towards and then into a liquid, b) an exemplary graph of the progression over time of a difference signal between a predicted momentary sample value and the momentary sample value of the measured absolute capacitance when applying the second prediction technique, and c) when alternatively applying the first prediction technique according to the present invention.
Figure 9:
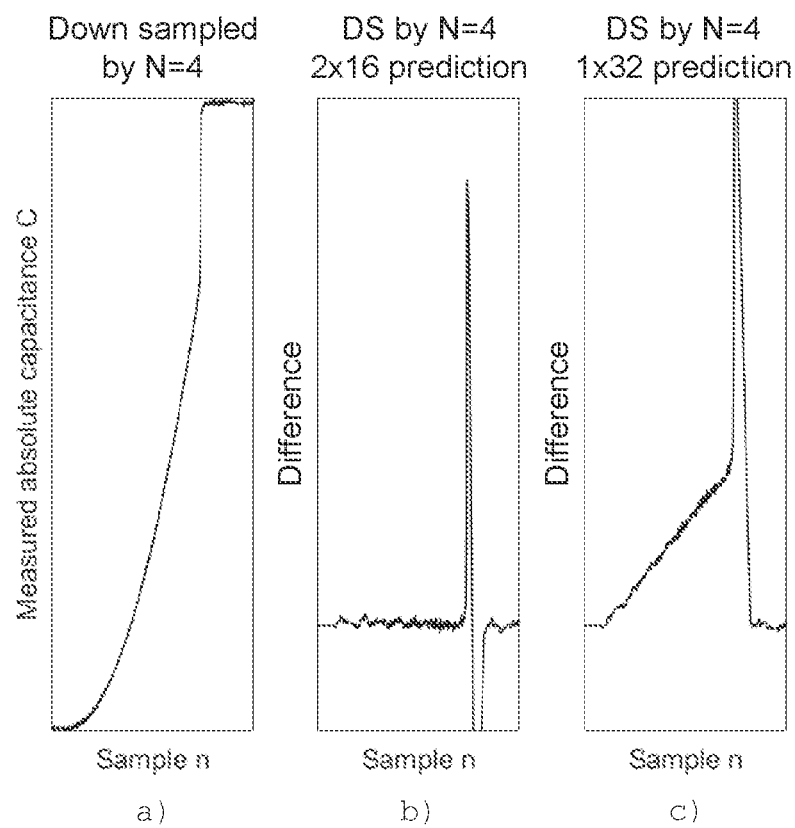
FIG. 9 *a*) an exemplary graph of the progression over time of a measured absolute capacitance as a pipette tip is lowered towards and then into a liquid when applying down sampling by a factor of four, b) an exemplary graph of the progression over time of a difference signal between a predicted momentary sample value and the momentary sample value of the measured absolute capacitance when applying down sampling by a factor of four and the second prediction technique, and c) alternatively applying the first prediction technique according to the present invention.

The signal-to-noise ratio (SNR) of the measured absolute capacitance C may optionally be increased by down sampling the measured absolute capacitance values, where measuring the absolute capacitance C is performed at a first sampling rate (to generate the sampled output signal $s_{out}[n']$) and the (down) sampled output signal $s_{out}[n]$ is generated at a second sampling rate by means of down sampling, for instance by a factor of N=4. As shown in FIG. 4 down sampling is for instance performed by determining a sum of or an average over N=4 consecutive measurement samples s[n'] to generate a sample of the down sampled output signal $s_d[n]$. This is achieved by the down sampling unit 11 shown in FIG. 1. The effect of down sampling in terms of noise reduction (and hence increased SNR) is clearly apparent when comparing FIG. 8 a) showing all the samples of the measured absolute capacitance signal and FIG. 9 a) showing the down sampled (by a factor of N=4) version of the measured absolute capacitance signal which is much smoother and will therefore less likely lead to false liquid contact detections.

Figure 5:
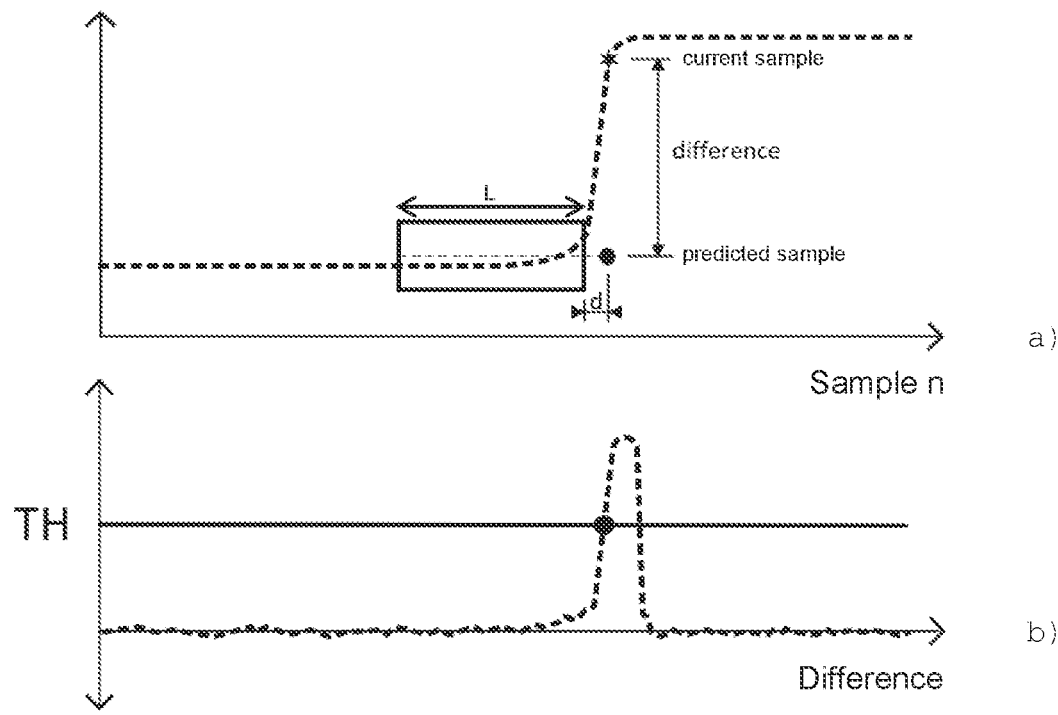
FIG. 5 *a*) an exemplary graph of the progression over time of a measured absolute capacitance as a pipette tip is lowered towards and then into a liquid, b) an exemplary graph of the progression over time of a difference signal between a predicted momentary sample value and the momentary sample value of the measured absolute capacitance when applying a first prediction technique according to the present invention.
Figure 6:
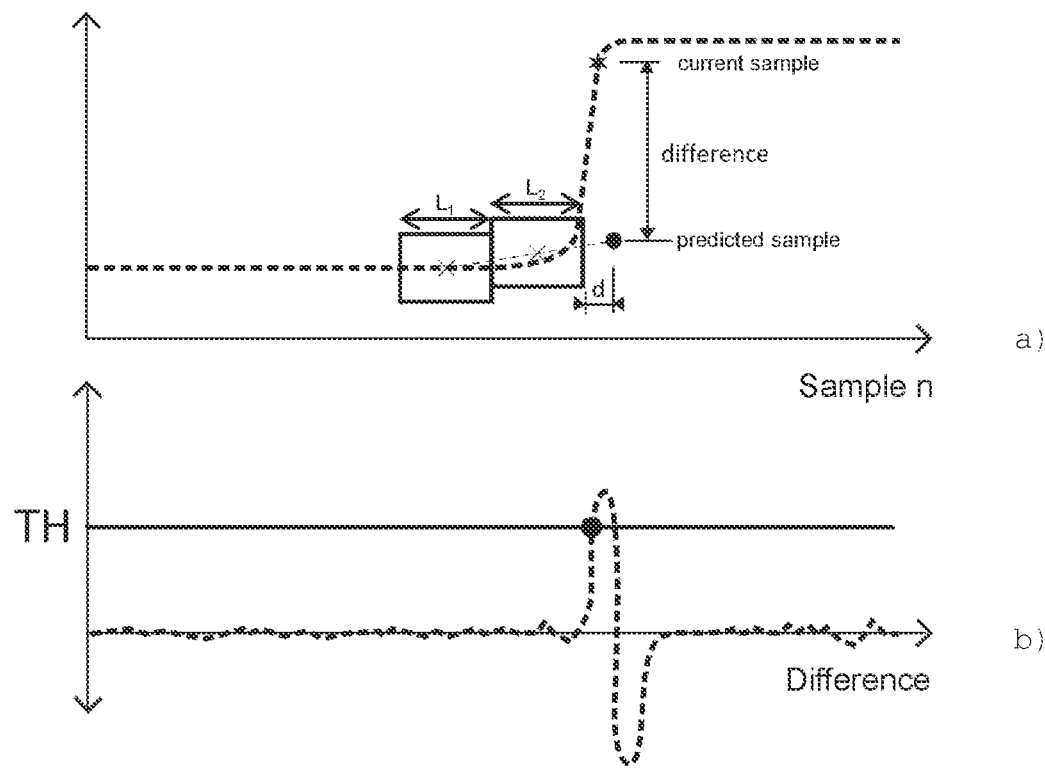
FIG. 6 *a*) an exemplary graph of the progression over time of a measured absolute capacitance as a pipette tip is lowered towards and then into a liquid, b) an exemplary graph of the progression over time of a difference signal between a predicted momentary sample value and the momentary sample value of the measured absolute capacitance when applying a second prediction technique according to the present invention.
Figure 10:
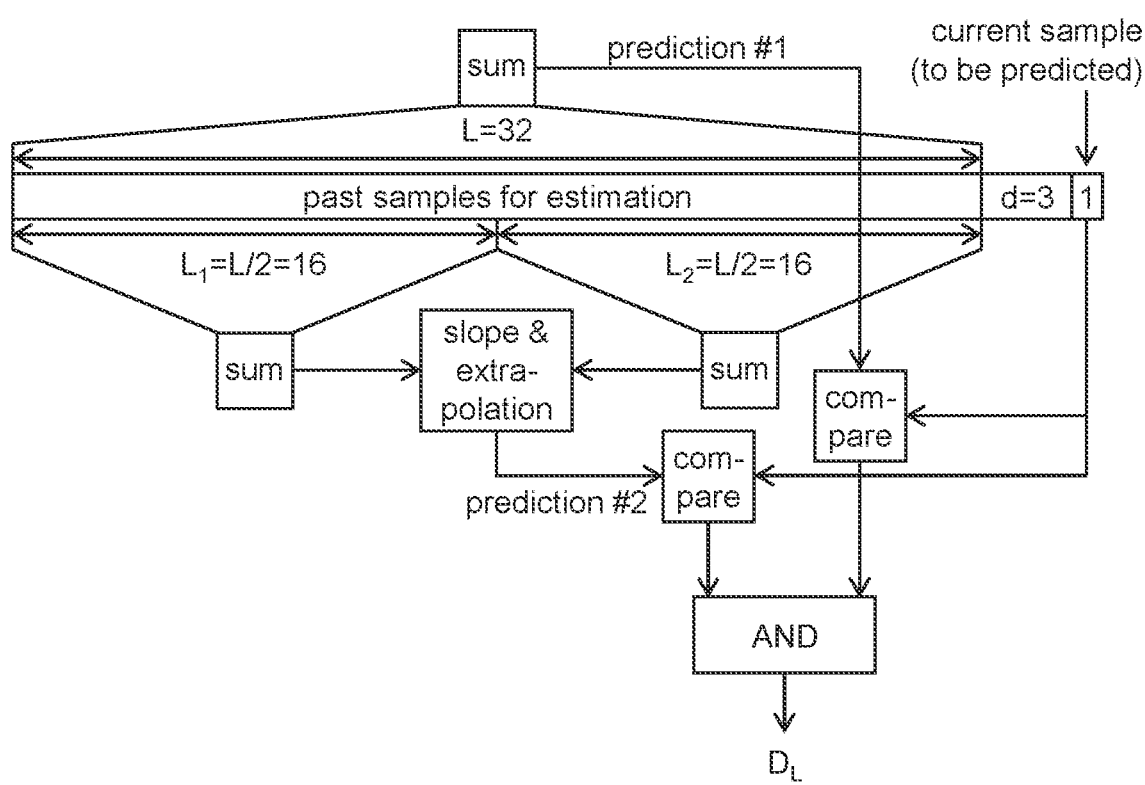
FIG. 10 a schematic illustration of a method according to the present invention for generating the liquid contact signal based on employing a combination of the first prediction technique and second prediction technique.

FIGS. 5 & 6 illustrate two alternative techniques for predicting the momentary sample value of the output signal $s_{out}[n]$ from a plurality of past sample values of the output signal $s_{out}[n]$. As mentioned above, prediction may be performing in several ways with different levels of complexity. The employed prediction technique may for instance comprise one or more (in combination) of curve fitting, FIR or IIR filtering, unweighted or weighted, e.g., exponentially weighted, (windowed, recursive) moving average filtering, linear or polynomial prediction, linear or polynomial regression, and Kalman filtering. FIG. 10 for instance illustrates a combination of the two prediction techniques employed in FIGS. 5 & 6 which yields an even more reliable liquid contact detection.

Figure 7:
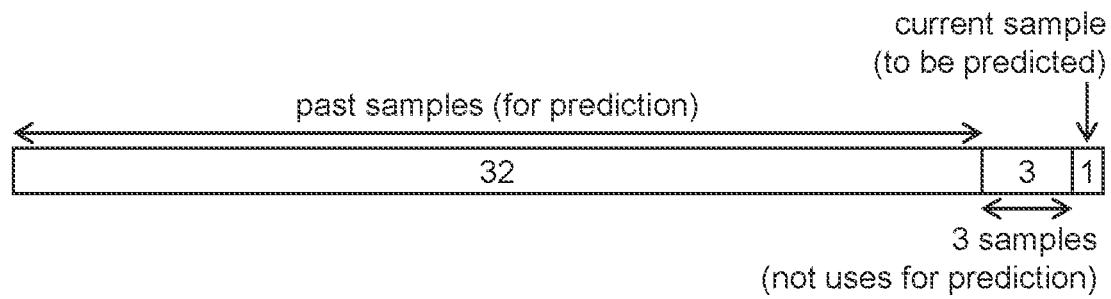
FIG. 7 a schematic illustration of the sample values of the measured capacitance as used in an embodiment according to the present invention.

A "first" exemplary prediction technique illustrated in FIG. 5 is based on averaging over 32 past sample values to predict/estimate the momentary/current sample value. This can be achieved by employing a 32-tap FIR filter, which simply calculates the sum over the 32 sample values (with all taps weighted by 1). The mean value is then the sum divided by 32. This mean value is taken as an estimate (i.e., the predicted value) of the momentary/current sample value. As shown in FIG. 7 the three samples immediately preceding the current sample are not taken in account for predicting the current sample—the prediction is based on the 32 samples preceding these three disregarded samples. The reason for doing so is to mask out the possible ascent in the capacitance curve towards the lump in capacitance. In this way the difference between the current sample value which is increased due to the onset of the lump in the capacitance curve and the predicted/estimated value, which is determined based on values that are still distant from this onset will be greater and consequently result in a correct indication of a liquid contact detection. This difference signal shown in FIG. 5 b). The contact signal $D_L$ will indicate a contact of the pipette tip 4 with the surface 7 of the liquid 6 as soon as the difference signal exceeds the threshold TH.

A problem of this prediction technique is that it is unable to take into account gradual increases of the slope of the capacitance curve which is often the case when the labware being used produces considerable capacitive coupling. In order to overcome this shortcoming of the "first" prediction technique, FIG. 6 illustrates an improved "second" exemplary prediction technique which takes into consideration the slope of the capacitance curve by extrapolating two mean values in order to predict the momentary/current sample value. The two mean values are derived from the same 32 past sample values as with the "first" prediction technique, whereby the first mean value is calculated from the 16 oldest sample values and the second mean value is calculated from the 16 newest sample values within the 32-tap FIR filter. The effect of the "first" prediction technique and "second" prediction technique on the difference signal (i.e., current value minus predicted value) can be seen in FIGS. 8 & 9 when comparing the difference signal b) when employing the "second" prediction technique (i.e., averaging over 2×16 samples+extrapolation) with the difference signal c) when employing the "first" prediction technique (i.e., simple averaging over 1×32 samples). Note that in FIG. 8 no down sampling is employed and that in FIG. 9 down sampling by a factor N=4 is employed leading to an increased SNR. Clearly, the slope (preceding the peak) in the difference signal resulting from applying the "first" prediction technique seen in FIGS. 8 c) & 9 c) will cause false contact detection alarms if the threshold is not set to a high level (which increases the detection delay).

As can be seen in FIGS. 6 b), 8 b) & 9 b) the difference signal exhibits both a positive and a subsequent negative amplitude shortly before and after the pipette tip 4 touches the surface 7 of the liquid 6. This can have a negative impact when capacitive coupling from neighbouring channels occurs in that this may result in false contact detection. To overcome this problem, it is for example proposed to concurrently apply the "first" prediction technique as well as the "second" prediction technique according to FIGS. 5 & 6 (i.e., employ two different prediction techniques simultaneously) and to perform contact detection based on the outcome from both, for instance by logically ANDing the two separate liquid contact detection decisions to provide a final joint decision. This yields an even more reliable liquid contact detection. Such a scheme is depicted in FIG. 10. Here an average/mean over the 32 past samples is calculated as a first prediction value which is compared with the momentary/current sample value and if the difference exceeds the threshold TH a first contact detection decision is positive. Concurrently, the same 32 samples are employed to calculate two average/mean values based upon which the second prediction value is determined via extrapolation. This second prediction value too is compared with the momentary/current sample value and if the difference exceeds the threshold TH a second contact detection decision is positive. A logical AND operation of the two contact detection decisions then results in the final liquid contact decision provided by the contact signal DL. As stated above other alternative predication techniques could be employed instead of the exemplary "first" prediction technique and "second" prediction technique explained above for illustrative purposes. Moreover, for example a weighted combination of multiple (e.g., even more than two) separate contact decisions may be used instead of the described logical AND operation. Thereby, the weights may be dependent on a "quality measure" associated with a certain prediction/detection technique, e.g., its likelihood of providing an incorrect contact alarm (i.e., a "false positive" probability) or not indicating a contact when one has occurred (i.e., a "false negative" probability).

LIST OF REFERENCE SYMBOLS 1 pipetting device
2 transport unit
3 pipette (tube)
4 pipette tip
5 container
6 liquid in container
7 surface of liquid
8 capacitance measuring unit
9 charging unit
10 discharging unit
11 down sampling unit
12 median filter
13 prediction/estimation unit
14 detection unit
15 carrier for holding container
16 grounded base plate
C absolute capacitance (=f($C_T$,$C_L$,$C_C$)~total series capacitance of $C_T$, $C_L$ & $C_C$)
$C_C$ carrier (labware) capacitance (incl. container)
$C_L$ liquid capacitance
$C_T$ tip capacitance
$D_L$ liquid contact signal
GND ground, reference potential
L, $L_1$, $L_2$ length of ($1^{st}/2^{nd}$) FIR/averaging filter (window length, number of taps)
m tip delivery motion
n, n' sample index
N down sampling factor
$R_C$ charging resistor/resistance
$R_D$ discharging resistor/resistance
$S_D$ discharging switch.
s[n'] sampled output signal (at first sampling rate)~absolute capacitance
$s_d$[n] down sampled signal (at second sampling rate)
$s_{in}$(t) input signal (applied to pipette tip)
$s_{out}$(t) output signal (in response to input signal)
$s_{out}$[n] sampled output signal~absolute capacitance
t time
TH detection threshold
U voltage source

The invention claimed is:

1. A method for detecting contact of a pipette tip (4) with a surface (7) of a liquid (6) in a pipetting device (1), the method comprising:
moving (m) the pipette tip (4) in direction of the surface (7) of the liquid (6);
measuring an absolute capacitance (C) between the pipette tip (4) and a reference potential (GND) comprising a grounded base plate (16) upon which a container (5) with the liquid (6) is arranged, and generating a sampled output signal ($s_{out}$[n]);
generating a predicted momentary sample value of the sampled output signal ($s_{out}$[n]) based on a plurality of past sample values of the sampled output signal ($s_{out}$[n]);
and
generating a contact signal ($D_L$) based on comparing the sampled output signal ($s_{out}$[n]) with the predicted momentary sample value of the sampled output signal ($s_{out}$[n]) by comparing a difference between the sampled output signal ($s_{out}$[n]) and the predicted momentary sample value of the sampled output signal ($s_{out}$[n]) with a predetermined threshold (TH), wherein the predetermined threshold (TH) comprises a user/manually selectable and/or adjustable threshold, the contact signal ($D_L$) being indicative of the pipette tip (4) being in contact with the surface (7) of the liquid (6).

2. The method of claim 1, wherein generating the sampled output signal ($s_{out}$[n]) comprises:
applying samples of the absolute capacitance (C) to a median filter (12), the median filter (12) comprising a median filter (12) of order in a range from three to six or a third order median filter (12).

3. The method of claim 1, wherein measuring the absolute capacitance (C) is performed at a first sampling rate and the sampled output signal ($s_{out}$[n]) is generated at a second sampling rate by means of down sampling by a factor of N in a range from 2 to 64, wherein the down sampling is performed by determining a sum of N consecutive samples or an average over the N consecutive samples to generate a down sampled output signal ($s_d$[n]).

4. The method of claim 1, wherein generating the predicted momentary sample value comprises applying one or more of the following to the sampled output signal ($s_{out}$[n]):
curve fitting;
finite impulse response (FIR) filtering;
infinite impulse response (IIR) filtering;
unweighted or weighted moving average filtering;
linear or polynomial prediction;
linear or polynomial regression; and
Kalman filtering.

5. The method of claim 1, wherein generating the predicted momentary sample value comprises applying the sampled output signal ($s_{out}$[n]) to a sliding window averaging filter, wherein a window length (L) is in a range from 8 to 64.

6. The method of claim 1, wherein generating the predicted momentary sample value comprises applying the sampled output signal ($s_{out}$[n]) to a first sliding window averaging filter and a second sliding window averaging filter, wherein window lengths ($L_1$, $L_2$) of the first sliding window averaging filter and the second sliding window averaging filter are identical and in a range from 8 to 64.

7. The method of claim 6, wherein a slope of the sampled output signal ($s_{out}$[n]) is determined based on an output of the first sliding window averaging filter and an output of the second sliding window averaging filter, wherein the predicted momentary sample value is based on linearly extrapolating the output of the first sliding window averaging filter and the output of the second sliding window averaging filter.

8. The method of claim 1, further comprising:
generating a further predicted momentary sample value of the sampled output signal ($s_{out}$[n]) based on the plurality of past sample values of the sampled output signal ($s_{out}$[n]),
wherein generating the further predicted momentary sample value is performed differently than generating the predicted momentary sample value, and is based on one or more further features different from one or more features used for generating the predicted momentary sample value, and
wherein generating the contact signal ($D_L$) is further based on comparing the sampled output signal ($s_{out}$[n]) with the further predicted momentary sample value of the sampled output signal ($s_{out}$[n]) by comparing a difference between the sampled output signal ($s_{out}$[n])

and the further predicted momentary sample value of the sampled output signal ($s_{out}[n]$) with a further predetermined threshold, wherein the further predetermined threshold comprises the user/manually selectable and/or adjustable threshold, the further predetermined threshold being the same as the predetermined threshold (TH).

9. The method of claim 1, wherein the plurality of past sample values of the sampled output signal ($s_{out}[n]$) are at least older by two sampling periods from the sampled output signal ($s_{out}[n]$).

10. The method of claim 1, wherein measuring the absolute capacitance (C) comprises charging and discharging a capacitor formed between the pipette tip (4) and the reference potential (GND), and determining a charging time as an elapsed time for charging the capacitor from a first charging state to a second charging state, the charging time being determined by a time-to-digital converter, wherein a measuring frequency is equal to a charging/discharging rate in a range from 100 kilohertz (kHz) to 500 kHz.

11. The method of claim 10, wherein charging the capacitor is performed by a voltage source (U) or current source via a charging resistor ($R_C$), and wherein discharging is performed via a switch ($S_D$) comprising a transistor via a discharging resistor ($R_D$).

12. A pipetting device (1) capable of detecting contact of a pipette tip (4) with a surface (7) of a liquid (6), the pipetting device (1) comprising:
   a pipette (3) with the pipette tip (4) adapted to aspirate and/or dispense the liquid (6);
   a transport unit (2) to which the pipette (3) is attached, the transport unit (2) adapted and configured to move (m) the pipette tip (4) in direction of the surface (7) of the liquid (6);
   a capacitance measuring unit (8) adapted and configured to measure an absolute capacitance (C) between the pipette tip (4) and a reference potential (GND) comprising a grounded base plate (16) upon which a container (5) with the liquid (6) is arranged, and to generate a sampled output signal ($s_{out}[n]$);
   a prediction unit (13) adapted and configured to generate a predicted momentary sample value of the sampled output signal ($s_{out}[n]$) based on a plurality of past sample values of the sampled output signal ($s_{out}[n]$); and
   a detection unit (14) adapted and configured to generate a contact signal ($D_L$) based on comparing the sampled output signal ($s_{out}[n]$) with the predicted momentary sample value of the sampled output signal ($s_{out}[n]$) by comparing a difference between the sampled output signal ($s_{out}[n]$) and the predicted momentary sample value of the sampled output signal ($s_{out}[n]$) with a predetermined threshold (TH), wherein the predetermined threshold (TH) comprises a user/manually selectable and/or adjustable threshold, the contact signal ($D_L$) being indicative of the pipette tip (4) being in contact with the surface (7) of the liquid (6).

13. The pipetting device (1) of claim 12, further comprising as part of the capacitance measuring unit (8), a median filter (12) adapted and configured to perform median filtering on samples of the absolute capacitance (C) and to generate samples of the sampled output signal ($s_{out}[n]$), the median filter (12) comprising a median filter (12) of order in a range from three to six or a third order median filter (12).

14. The pipetting device (1) of claim 12 . . . by a factor of N in a range from 2 to 64, wherein the down sampling is performed by determining a sum of N consecutive samples or an average over the N consecutive samples to generate a down sampled output signal ($s_d[n]$).

15. The pipetting device (1) of claim 12, wherein the prediction unit (13) comprises one or more of the following to which the sampled output signal ($s_{out}[n]$) is applied:
   a curve fitting unit;
   a finite impulse response (FIR) filter;
   an infinite impulse response (IIR) filter;
   an unweighted or weighted moving average filter;
   a linear or polynomial prediction unit;
   a linear or polynomial regression unit; and
   a Kalman filter.

16. The pipetting device (1) of claim 12, wherein the prediction unit (13) comprises a sliding window averaging filter to which the sampled output signal ($s_{out}[n]$) is applied, wherein a window length (L) is in a range from 8 to 64.

17. The pipetting device (1) of claim 12, wherein the prediction unit (13) comprises a first sliding window averaging filter and a second sliding window averaging filter in series to which the sampled output signal ($s_{out}[n]$) is applied, wherein window lengths ($L_1$, $L_2$) of the first sliding window averaging filter and the second sliding window averaging filter are identical and in a range from 8 to 64.

18. The pipetting device (1) of claim 17, wherein the prediction unit (13) is adapted and configured to determine a slope of the sampled output signal ($s_{out}[n]$) based on an output of the first sliding window averaging filter and an output of the second sliding window averaging filter, wherein the predicted momentary sample value is based on linearly extrapolating the output of the first sliding window averaging filter and the output of the second sliding window averaging filter.

19. The pipetting device (1) of claim 12, wherein the prediction unit (13) is adapted and configured to generate a further predicted momentary sample value of the sampled output signal ($s_{out}[n]$) based on the plurality of past sample values of the sampled output signal ($s_{out}[n]$),
   wherein generating the further predicted momentary sample value is performed differently than generating the predicted momentary sample value, and is based on one or more further features different from one or more features used for generating the predicted momentary sample value, and
   wherein the prediction unit (13) is adapted and configured to generate the contact signal ($D_L$) further based on comparing the sampled output signal ($s_{out}[n]$) with the further predicted momentary sample value of the sampled output signal ($s_{out}[n]$) by comparing a difference between the sampled output signal ($s_{out}[n]$) and the further predicted momentary sample value of the sampled output signal ($s_{out}[n]$) with a further predetermined threshold, wherein the further predetermined threshold comprises the user/manually selectable and/or adjustable threshold, the further predetermined threshold being the same as the predetermined threshold (TH).

20. The pipetting device (1) of claim 12, wherein the plurality of past sample values of the sampled output signal ($s_{out}[n]$) are at least older by two sampling periods from the sampled output signal ($s_{out}[n]$).

21. The pipetting device (1) of claim 12, wherein the capacitance measuring unit (8) comprises a charging unit (9) and a discharging unit (10) adapted and configured to charge and discharge a capacitor formed between the pipette tip (4) and the reference potential (GND), and a time measurement unit adapted and configured to determine a charging time as an elapsed time for charging the capacitor from a first charging state to a second charging state, the time measurement unit being a time-to-digital converter, wherein a measuring frequency is equal to a charging/discharging rate in a range from 100 kilohertz (kHz) to 500 kHz.

22. The pipetting device (1) of claim 21, wherein the charging unit (9) comprises a voltage source (U) or a current source and a charging resistor ($R_C$), and wherein the discharging unit (10) comprises a switch ($S_D$) comprising a transistor and a discharging resistor ($R_D$).

23. A laboratory system comprising an automated liquid processing system comprising one or more pipetting devices (1) according to claim 12.

* * * * *